US 9,971,120 B2

United States Patent
Rudenick et al.

(10) Patent No.: US 9,971,120 B2
(45) Date of Patent: May 15, 2018

(54) ANCHORING CABLES TO RACK WITH CABLE CLAMP ARRANGEMENTS

(71) Applicant: COMMSCOPE TECHNOLOGIES LLC, Hickory, NC (US)

(72) Inventors: Paula Rudenick, Jordan, MN (US); Scott Sievers, Jordan, MN (US); Raul Mario Saucedo, Chihuahua (MX)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 499 days.

(21) Appl. No.: 14/068,444

(22) Filed: Oct. 31, 2013

(65) Prior Publication Data
US 2014/0131527 A1    May 15, 2014

Related U.S. Application Data

(60) Provisional application No. 61/720,847, filed on Oct. 31, 2012, provisional application No. 61/721,350, filed on Nov. 1, 2012.

(51) Int. Cl.
*G02B 6/44* (2006.01)
*G02B 6/38* (2006.01)
(Continued)

(52) U.S. Cl.
CPC ......... *G02B 6/4479* (2013.01); *G02B 6/4452* (2013.01); *G02B 6/4471* (2013.01);
(Continued)

(58) Field of Classification Search
CPC .. G02B 6/4452; G02B 6/4471; G02B 6/3897; G02B 6/4454; G02B 6/4446; F16L 3/00;
(Continued)

(56) References Cited

U.S. PATENT DOCUMENTS 2,318,853 A    5/1943  Hall
3,023,989 A *  3/1962  White ................... F16L 3/2235
                                                    174/135
(Continued)

FOREIGN PATENT DOCUMENTS

JP    3-296298    12/1991
JP    11-346072   12/1999
(Continued)

OTHER PUBLICATIONS

International Search Report and Written Opinion for PCT/US2013/067780 dated Feb. 17, 2014.
(Continued)

*Primary Examiner* — Stanton L Krycinski
*Assistant Examiner* — Taylor L Morris
(74) *Attorney, Agent, or Firm* — Merchant & Gould P.C.

(57) ABSTRACT

Securing a cable to a panel includes assembling a cable clamp arrangement to a cable and mounting the cable clamp arrangement to the panel. Assembling the cable clamp arrangement includes disposing a grommet around an exterior surface of the cable; disposing a yoke around the grommet so that the yoke at least partially surrounds the grommet; and compressing the yoke and grommet between a bracket and a backing plate using a fastener so that the cable is compressed. Mounting the cable clamp arrangement to the panel includes sliding the bracket relative to the panel in a direction parallel to a surface of the panel until the bracket rests on fasteners extending from the panel. Mounting the clamp arrangement can also include tightening the fasteners.

23 Claims, 15 Drawing Sheets

(51) Int. Cl.
*H02G 3/32* (2006.01)
*H02G 3/30* (2006.01)

(52) U.S. Cl.
CPC ............. *G02B 6/3897* (2013.01); *H02G 3/30* (2013.01); *H02G 3/32* (2013.01); *Y10T 29/49959* (2015.01)

(58) Field of Classification Search
CPC ......... F16L 3/223; F16L 3/227; F16L 3/1091; F16L 55/035; F16L 3/18; F16L 3/24; F16L 3/2235; H02G 3/22; H02G 3/30; H02G 3/32; H01R 13/518
USPC ... 248/49, 65, 67.7, 68.1, 70, 73, 74.1, 74.4; 174/68.3
See application file for complete search history.

(56) References Cited

U.S. PATENT DOCUMENTS

| | | | |
|---|---|---|---|
| 3,061,253 A | 10/1962 | Keaton | |
| 3,397,431 A * | 8/1968 | Walker | F16L 3/2235 248/68.1 |
| 3,606,217 A * | 9/1971 | Lieferman | E03C 1/042 248/57 |
| 3,618,882 A * | 11/1971 | Podedworny | F16L 3/00 248/68.1 |
| 3,680,817 A * | 8/1972 | Gogan | H02G 3/0456 248/68.1 |
| 3,802,654 A | 4/1974 | Jenko et al. | |
| 3,944,175 A * | 3/1976 | Kearney | F16L 3/227 248/201 |
| 4,119,285 A | 10/1978 | Bisping et al. | |
| 4,217,030 A * | 8/1980 | Howarth | G02B 6/3841 385/59 |
| 4,304,077 A * | 12/1981 | Muller | E02F 3/36 248/68.1 |
| 4,561,153 A | 12/1985 | Matsui | |
| 4,805,479 A | 2/1989 | Brightwell | |
| 4,805,979 A * | 2/1989 | Bossard | G02B 6/4446 385/135 |
| 4,995,688 A * | 2/1991 | Anton | G02B 6/3825 385/53 |
| 5,050,824 A * | 9/1991 | Hubbard | F16L 3/24 248/57 |
| 5,085,384 A * | 2/1992 | Kasubke | F16L 3/01 248/62 |
| 5,098,047 A * | 3/1992 | Plumley | F16L 3/2235 248/68.1 |
| 5,146,532 A * | 9/1992 | Hodge | G02B 6/4439 385/135 |
| 5,458,019 A * | 10/1995 | Trevino | G02B 6/4452 385/134 |
| 5,529,268 A | 6/1996 | Wright | |
| 5,560,162 A * | 10/1996 | Kemeny | E04H 9/02 52/167.3 |
| 5,593,115 A * | 1/1997 | Lewis | F16L 3/227 248/200.1 |
| 5,742,982 A | 4/1998 | Dodd et al. | |
| 5,871,182 A * | 2/1999 | Johnson | F16L 3/26 248/49 |
| 5,887,487 A | 3/1999 | Bravo | |
| 5,887,832 A * | 3/1999 | Elvegaard | F16L 3/237 248/68.1 |
| 6,037,544 A * | 3/2000 | Lee | H02G 15/013 174/92 |
| 6,062,515 A * | 5/2000 | Snyder | E04C 3/02 248/217.2 |
| 6,142,428 A * | 11/2000 | Kamata | F16L 3/1207 248/49 |
| 6,170,784 B1 * | 1/2001 | MacDonald | H05K 7/1448 211/26 |
| 6,173,926 B1 * | 1/2001 | Elvegaard | F16L 3/1075 248/68.1 |
| 6,249,636 B1 * | 6/2001 | Daoud | G02B 6/4471 385/135 |
| 6,274,812 B1 * | 8/2001 | Daoud | H02G 3/088 16/2.2 |
| 6,332,594 B2 | 12/2001 | Shelton et al. | |
| 6,443,402 B1 | 9/2002 | Ferrill et al. | |
| 6,519,791 B2 * | 2/2003 | Randolph | E03C 1/021 4/695 |
| 6,547,192 B2 * | 4/2003 | Rinderer | H02G 3/0608 248/49 |
| 6,561,466 B1 * | 5/2003 | Myers | F16L 3/227 248/68.1 |
| 6,571,047 B1 * | 5/2003 | Yarkosky | G02B 6/4452 385/135 |
| 6,591,051 B2 | 7/2003 | Solheid et al. | |
| 6,717,055 B2 * | 4/2004 | Kato | H02G 3/32 173/136 |
| 6,726,165 B2 | 4/2004 | Sawayanagi et al. | |
| 6,768,858 B2 * | 7/2004 | Tinucci | G02B 6/4471 385/134 |
| 6,866,541 B2 * | 3/2005 | Barker | G02B 6/4452 439/540.1 |
| 6,902,138 B2 * | 6/2005 | Vantouroux | F16L 3/1091 248/68.1 |
| 7,077,363 B2 | 7/2006 | Rivera | |
| 7,079,745 B1 * | 7/2006 | Weinert | G02B 6/4457 385/134 |
| 7,150,439 B2 | 12/2006 | Konold | |
| 7,186,929 B2 * | 3/2007 | Cox | H02G 3/088 16/2.1 |
| 7,201,352 B2 | 4/2007 | Kawai | |
| 7,210,658 B2 | 5/2007 | Carrera | |
| 7,267,307 B2 | 9/2007 | Bauer | |
| 7,310,471 B2 * | 12/2007 | Bayazit | G02B 6/4471 385/134 |
| 7,345,241 B2 | 3/2008 | Caveney et al. | |
| 7,352,947 B2 * | 4/2008 | Phung | G02B 6/4459 248/49 |
| 7,377,472 B2 * | 5/2008 | Brown | F16L 3/10 24/16 R |
| 7,522,805 B2 * | 4/2009 | Smith | G02B 6/4452 385/135 |
| 7,527,226 B2 | 5/2009 | Kusuda et al. | |
| 7,760,982 B2 * | 7/2010 | Quan | G02B 6/4466 385/134 |
| 8,020,810 B2 | 9/2011 | Dietrich et al. | |
| 8,074,945 B2 | 12/2011 | Schoenau et al. | |
| 8,285,104 B2 | 10/2012 | Davis et al. | |
| 8,290,330 B2 | 10/2012 | Taylor et al. | |
| 8,290,333 B2 | 10/2012 | Barlowe et al. | |
| 8,485,479 B2 | 7/2013 | Chiu et al. | |
| 8,620,128 B2 | 12/2013 | Holmberg et al. | |
| 8,905,361 B2 | 12/2014 | Gollin et al. | |
| 8,985,533 B2 * | 3/2015 | Edmond | F16L 3/1222 248/68.1 |
| 9,042,702 B2 | 5/2015 | Rodriguez et al. | |
| 9,274,300 B2 * | 3/2016 | Miller | G02B 6/4452 |
| 2006/0237212 A1 | 10/2006 | Komiya | |
| 2007/0110373 A1 * | 5/2007 | Dudek | G02B 6/4292 385/89 |
| 2008/0169386 A1 | 7/2008 | Schnyder et al. | |
| 2009/0207577 A1 * | 8/2009 | Fransen | H01R 13/514 361/790 |
| 2009/0218451 A1 * | 9/2009 | Lundborg | F16L 5/02 248/56 |
| 2010/0202740 A1 * | 8/2010 | Barlowe | G02B 6/4471 385/100 |
| 2010/0243855 A1 * | 9/2010 | Sampson | F16L 3/123 248/534 |
| 2011/0052132 A1 * | 3/2011 | Teymouri | G02B 6/4441 385/135 |
| 2011/0080078 A1 * | 4/2011 | Perschon | H02B 1/305 312/293.1 |
| 2011/0267794 A1 * | 11/2011 | Anderson | G02B 6/4452 361/810 |
| 2012/0097804 A1 | 4/2012 | Liu | |

(56) References Cited

U.S. PATENT DOCUMENTS

| | | | | |
|---|---|---|---|---|
| 2012/0318933 A1* | 12/2012 | Kimbrell | .............. | G02B 6/4471 |
| | | | | 248/56 |
| 2013/0058616 A1* | 3/2013 | Cote | .................. | G02B 6/4471 |
| | | | | 385/137 |
| 2013/0104494 A1* | 5/2013 | Evangelista | ........... | H02G 3/125 |
| | | | | 52/741.1 |
| 2013/0140410 A1 | 6/2013 | Lee et al. | | |
| 2013/0266282 A1 | 10/2013 | Holmberg et al. | | |
| 2015/0152980 A1* | 6/2015 | Okura | ................ | B60R 16/0215 |
| | | | | 248/74.2 |

FOREIGN PATENT DOCUMENTS

| | | |
|---|---|---|
| JP | 2004-297926 | 10/2004 |
| WO | WO 2012/121955 A1 | 9/2012 |

OTHER PUBLICATIONS

Optical Distribution Frames 3rd Edition, *TE Connectivity*, 7 pages (abridged) (Jul. 2012).

U.S. Appl. No. 61/704,330, filed Sep. 21, 2012, and titled "Slidable Fiber Optic Connection Module with Cable Slack Management,".

* cited by examiner

ANCHORING CABLES TO RACK WITH CABLE CLAMP ARRANGEMENTS

CROSS REFERENCE TO RELATED APPLICATIONS

This present application claims the benefit of U.S. Provisional Patent Application Ser. No. 61/720,847, filed Oct. 31, 2012 and U.S. Provisional Patent Application Ser. No. 61/721,350, filed Nov. 1, 2012, which applications are hereby incorporated by reference in their entireties.

BACKGROUND

In telecommunications industry, the demand for added capacity is growing rapidly. This demand is being met in part by the increasing use and density of fiber optic transmission equipment. Even though fiber optic equipment permits higher levels of transmission in the same or smaller footprint than traditional copper transmission equipment, the demand requires even higher levels of fiber density. This has led to the development of high-density fiber handling equipment.

An example of this type of equipment is found in U.S. Pat. No. 6,591,051 (the '051 patent) assigned to ADC Telecommunications, Inc. This patent concerns a high-density fiber distribution frame and high-density fiber termination blocks (FTBs) which are mounted to the frame. Because of the large number of optical fibers passing into and out of the FTBs, the frame and blocks have a variety of structures to organize and manage the fibers. Some structures are used to aid the fibers entering the back of the frame and FTBs. Other structures are provided for managing the cables leaving the FTBs on the front. The FTBs also include structures for facilitating access to the densely packed terminations. One such structure is a slidable adapter module that is incorporated into the FTBs to allow selective access to the densely packed terminations inside the FTBs.

Further development in such fiber termination systems is desired.

SUMMARY

Some aspects of the disclosure are directed to a device and a method for securing a cable to a panel including assembling a cable clamp arrangement; and mounting the cable clamp arrangement to the panel. The cable clamp arrangement includes first mounting a clamp to the cable, and then mounting the clamp to a panel.

Assembling a cable clamp arrangement includes disposing a grommet around an exterior surface of the cable; disposing a yoke around the grommet so that the yoke at least partially surrounds the grommet; and compressing the yoke and grommet between a bracket and a backing plate using a fastener so that the cable is compressed radially inwardly.

Mounting the cable clamp arrangement to the panel includes sliding the bracket relative to the panel in a direction parallel to a surface of the panel until the bracket is secured to the panel.

The panel may include two sides which are staggered relative to one another.

The panel may include staggered bracket mounting locations for adjacent cable clamps.

In some implementations, the brackets are slid so that screws or other fasteners extending outwardly from the major surface of the panel move into open-ended slots defined in the bracket until the bracket seats on the screws. In certain implementations, the screws are tightened to lock the bracket to the panel.

Other aspects of the disclosure are directed to a cable anchor system including a panel, a fastener, and a cable clamp arrangement. The panel includes a first mounting section at which a first mounting location is disposed. The first mounting location defines a fastener aperture. The fastener is disposed in the fastener aperture at the first mounting location. The cable clamp arrangement includes a bracket, a grommet, and a back plate. The grommet is configured to be transversely compressed between the bracket and the back plate. The bracket includes an engagement section defining an open-ended slot that is sized to slide around the fastener at the first mounting location. The fastener includes a head that is sufficient to hold the bracket to the panel when the fastener is tightened.

Other aspects of the disclosure are directed to a cable clamp arrangement for mounting a cable to a panel. The cable clamp arrangement includes a bracket, a back plate, a grommet, a yoke, and a fastener. The bracket has a bracket body defining a first mounting region and a second mounting region spaced from the first engagement region. The first mounting region defines at least one fastener opening. The second engagement region defines an open-ended slot extending along a first direction. The back plate defines a fastener opening. The grommet is sized and configured to extend around a portion of the cable to form a grommeted cable. The yoke is configured to surround the grommet to mount the grommeted cable to the panel. A first side of the yoke is configured to engage the first engagement region of the bracket so that the grommeted cable extends along the first direction. A second side of the yoke is configured to engage the back plate. The fastener is configured to extend through the fastener opening of the bracket, through the yoke, and through the fastener opening of the backing plate to hold the back plate to the bracket. The fastener is configured to move the back plate and the bracket towards each other to compress the yoke and grommet therebetween.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

Figure 1:
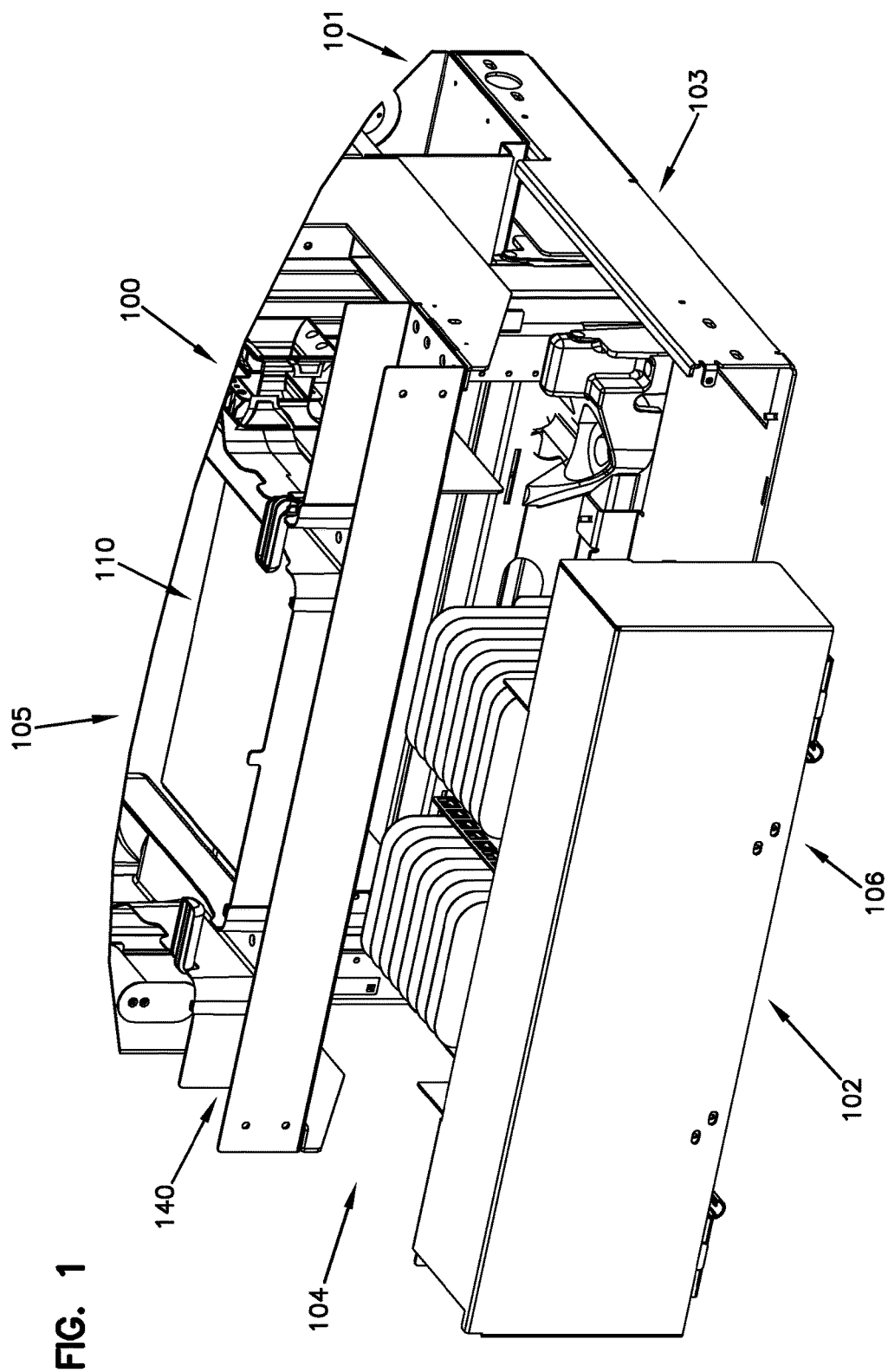
FIG. 1 is a partial perspective view of an example rack including a cable anchor region.
Figure 2:
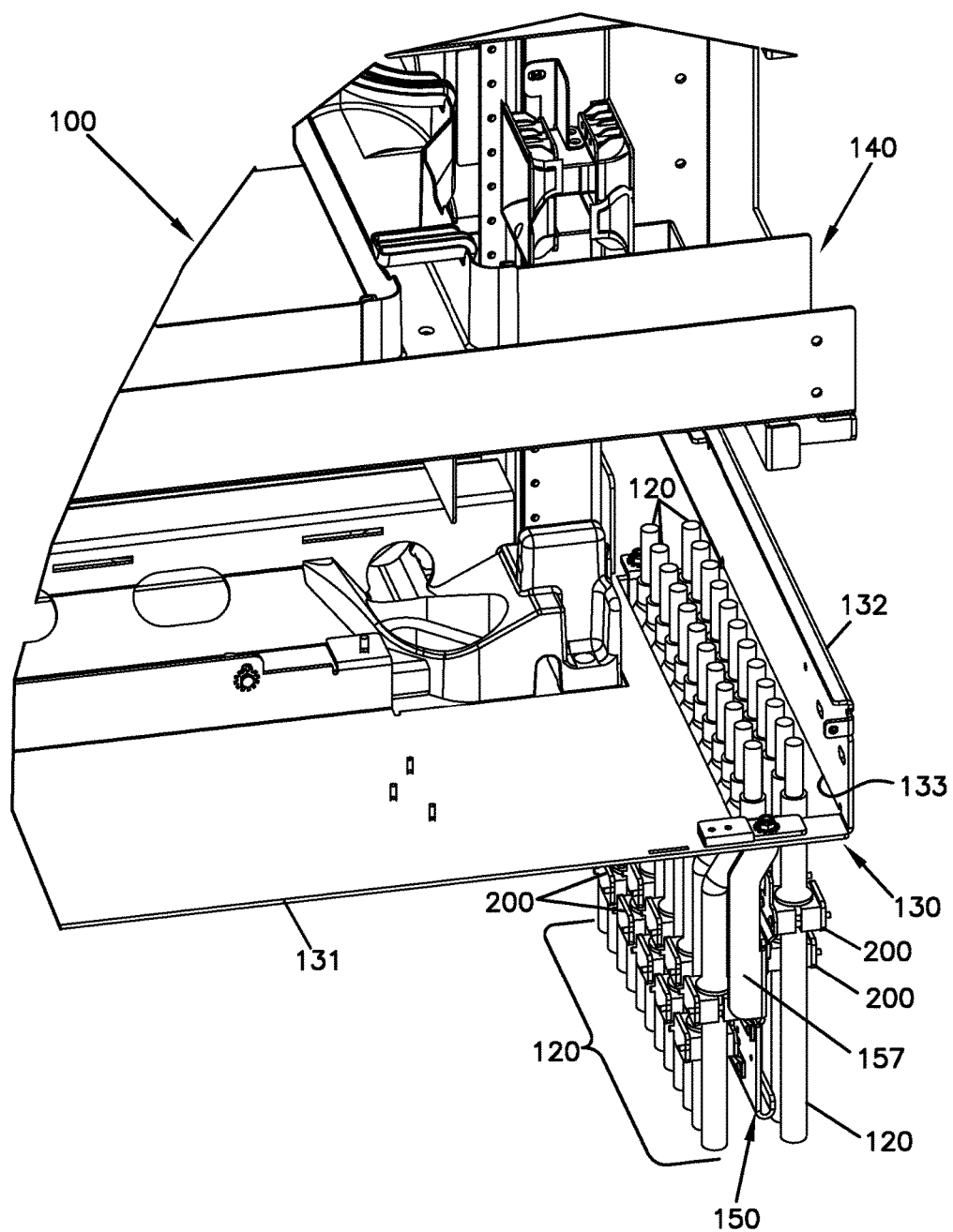
FIG. 2 is a partial perspective view of the cable anchor region of the rack of FIG. 1 at which cables can be secured using cable clamp arrangements.

FIGS. 1 and 2 illustrate an example rack 100 at which optical fibers can be connected. The rack 100 has a front 101, a rear 102, a first side 103, a second side 104, a top 105, and a bottom 106. The rack 100 defines one or more termination regions 110. In certain implementations, the rack 100 includes a vertical stack of termination regions 110. Connection locations at the termination regions 110 are accessible from both the front 101 and rear 102 of the rack 100. A trough system 140 connects each termination region 110 of the rack 100 with other termination regions 110 of the rack 100 or with termination regions 110 of other racks 100.

In some implementations, termination modules are mounted at the termination regions 110. In various implementations, the termination modules can define individually mounted optical adapters, blocks of integrally formed optical adapters, and/or cassettes that include optical adapters having either a multi-fiber connector or a multi-fiber cable extending outwardly therefrom. In certain implementations, termination modules are slidable relative to the rack 100. Example slidable termination modules can be found in U.S. Provisional Application No. 61/704,330, filed Sep. 21, 2012, and titled "Slidable Fiber Optic Connection Module with Cable Slack Management," the disclosure of which is hereby incorporated herein by reference.

The rack 100 includes an anchor region 130 at which one or more optical cables 120 (e.g., multi-fiber cables, such as IFC cables) are secured to the rack 100. In some implementations, the anchor region 130 is located at the rear 102 of the rack 100. In certain implementations, the anchor region 130 is located at the bottom 106 of the rack 100. In other implementations, the anchor region 130 is located at the top 105 of the rack 100. In the example shown, the anchor region 130 is located at the first side 103 of the rack 100 at the bottom 106. The optical cables 120 are secured to the rack 100 at the anchor region 130. Optical fibers (e.g., loose, buffered, ribbonized, upjacketed, etc.) extend from the anchor region 130 to equipment on the rack 100 (e.g., the termination modules, splice cassettes, etc.).

Figure 3:
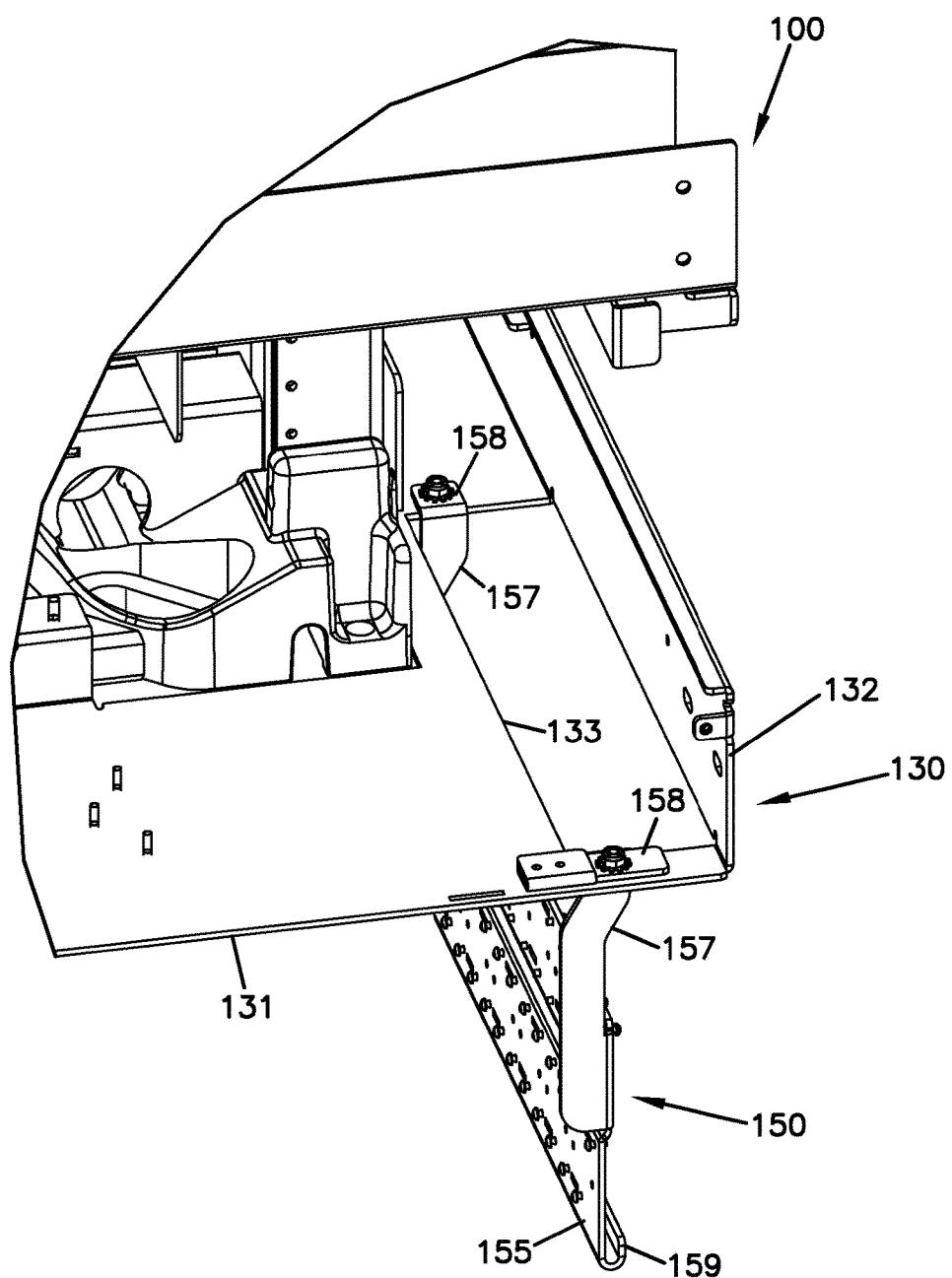
FIG. 3 is a partial perspective view of the cable anchor region of FIG. 2 with the cables and cable clamp arrangements.

FIGS. 3-7 illustrate a mounting panel 150 coupled to the rack 100 at the anchor region 130. The cables 120 are secured to the mounting panel 150. In some implementations, the mounting panel 150 couples to a bottom 106 of the rack 100 and extends downwardly from the rack 100. In the example shown, the mounting panel 150 hangs from the bottom 106 of the rack 100. For example, as shown in FIGS. 2 and 3, the anchor region 130 includes a bottom panel 131 and a side panel 132 that cooperate to define an aperture 133. The mounting panel 150 is coupled to the bottom panel 131 to hang beneath the aperture 133.

Figure 4:
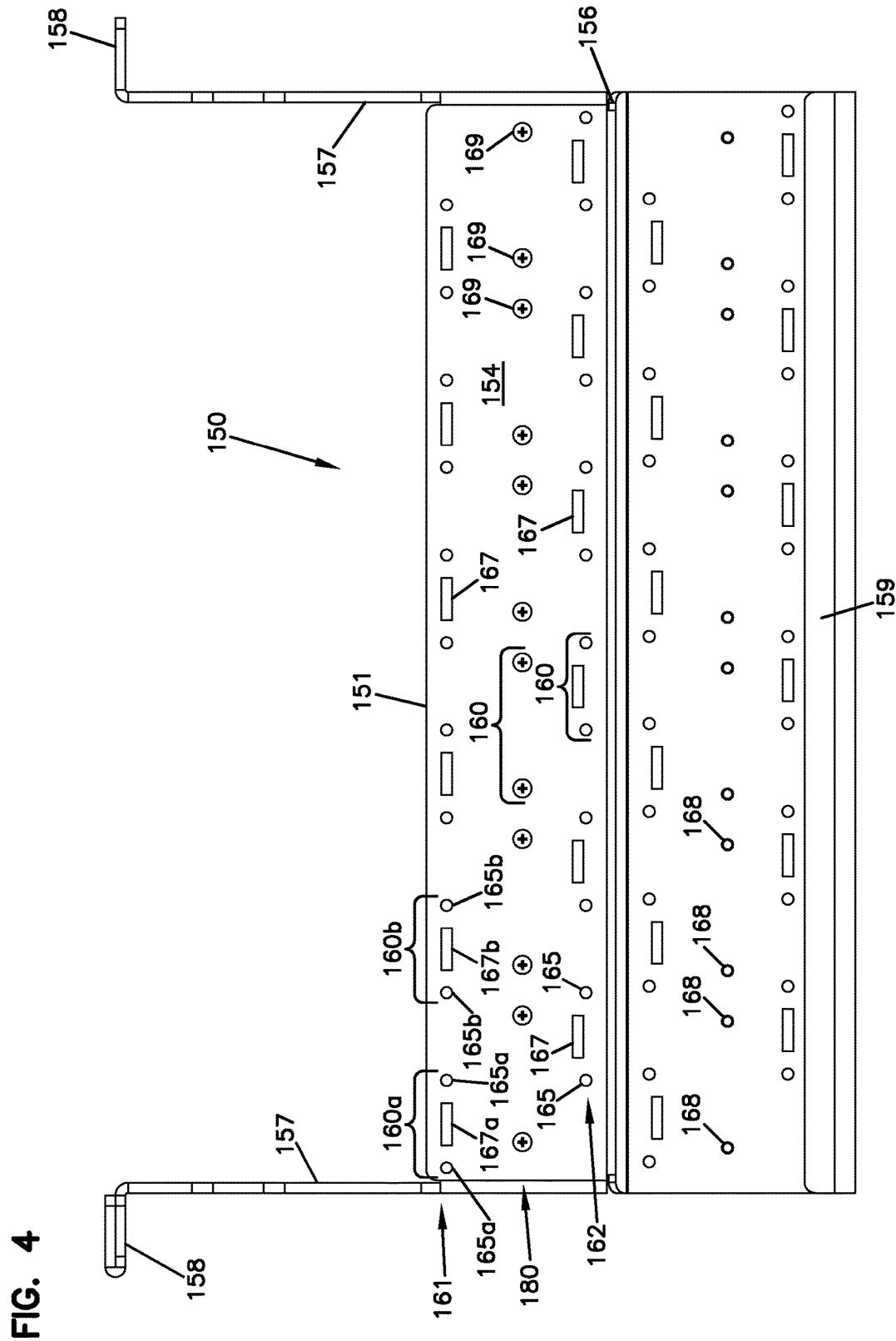
FIG. 4 is a first side elevational view of the mounting panel of FIG. 3.
Figure 5:
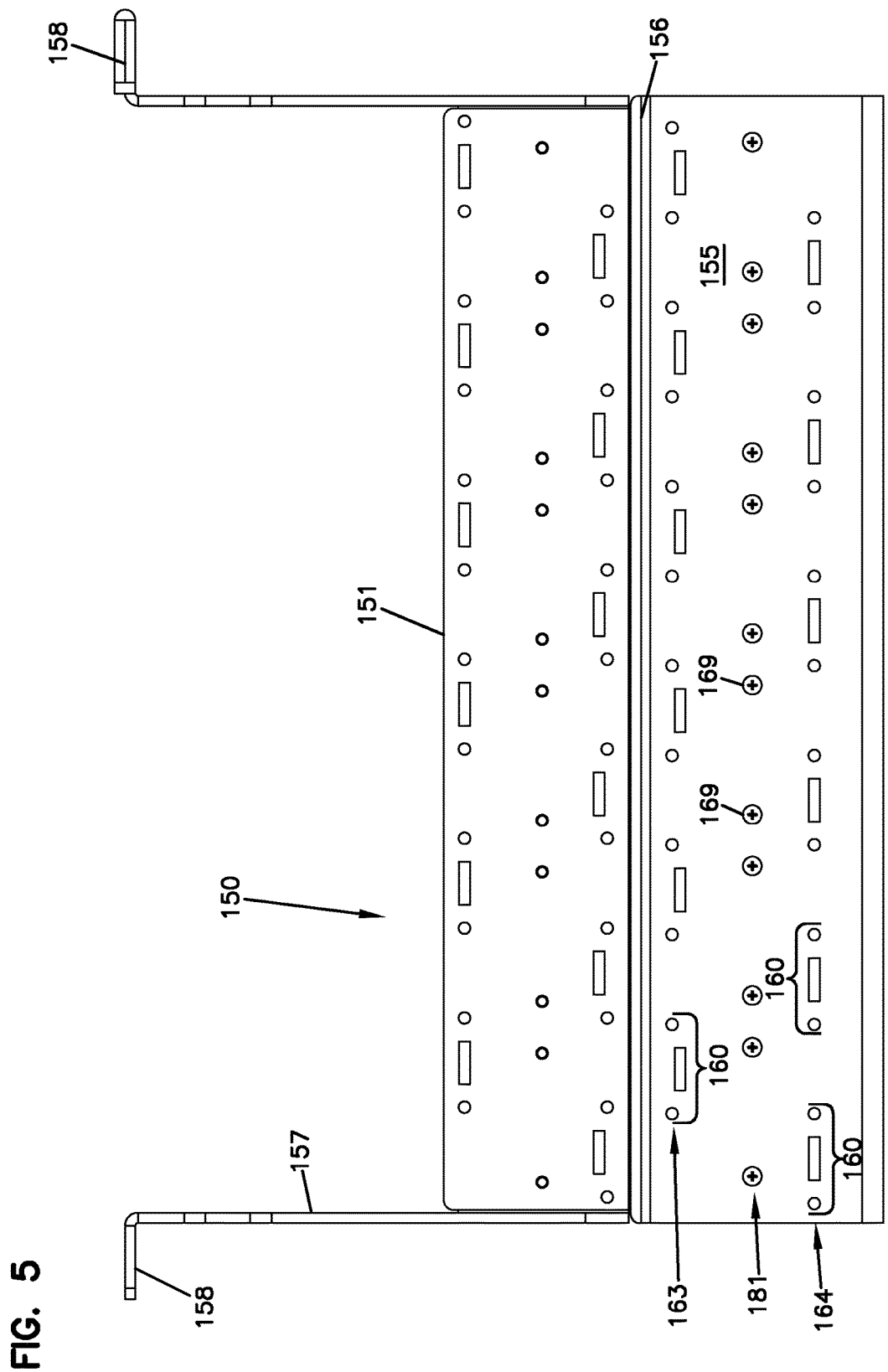
FIG. 5 is a second side elevational view of the mounting panel of FIG. 3.
Figure 6:
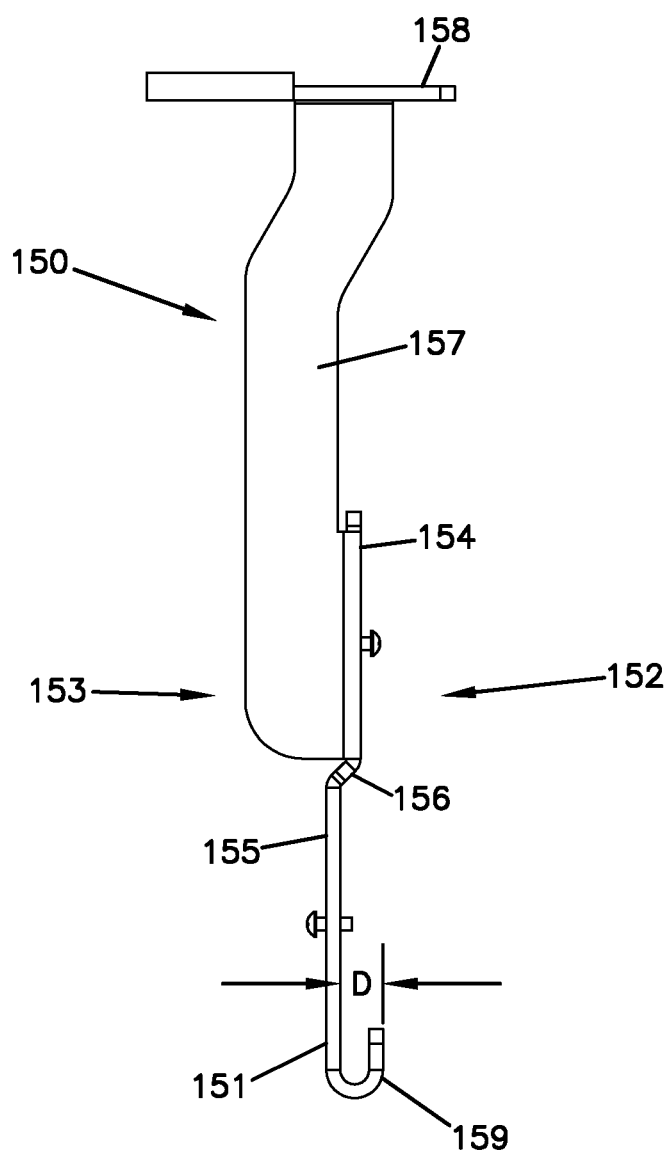
FIG. 6 is an edge view of the mounting panel of FIG. 3.
Figure 7:
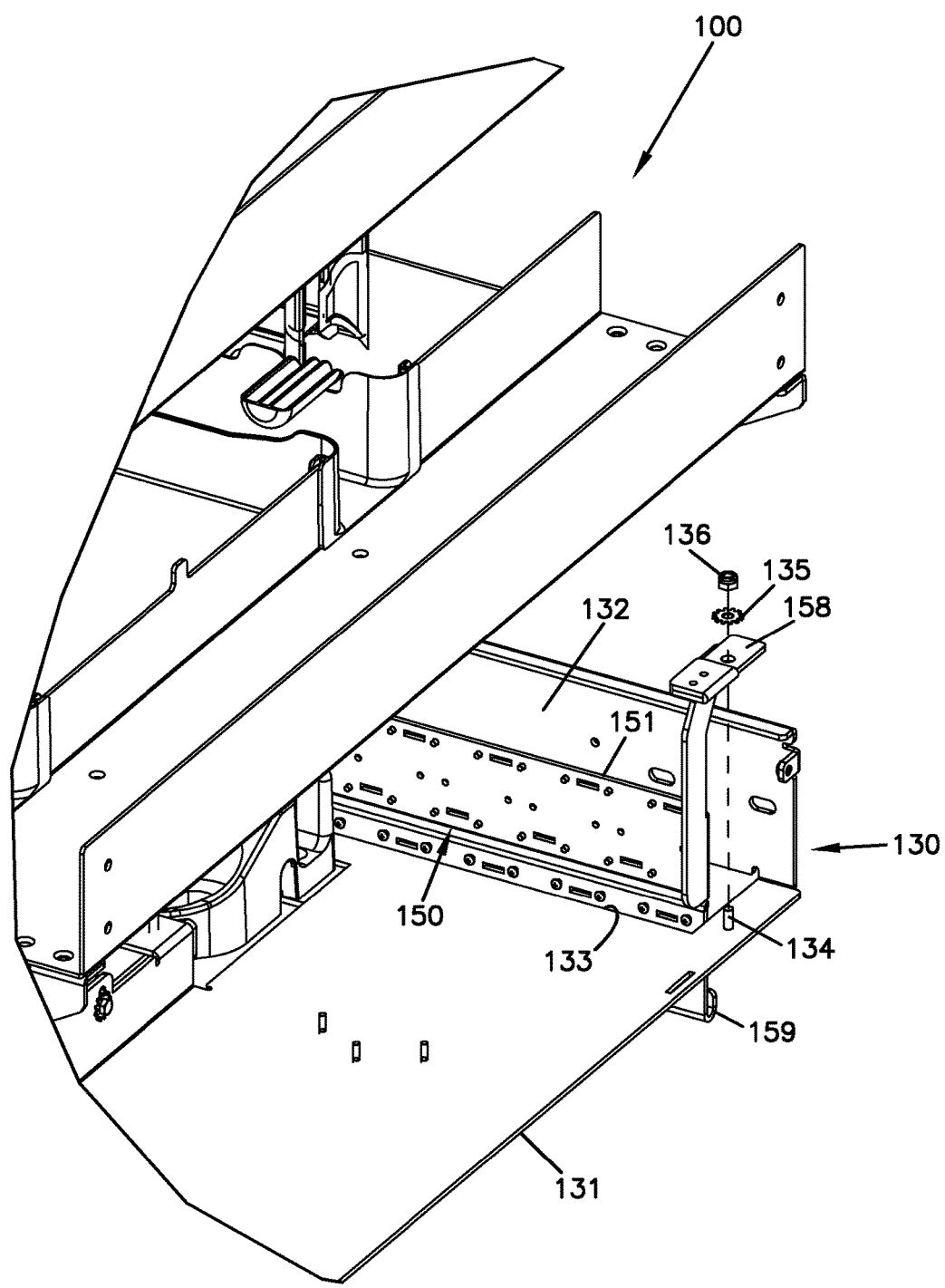
FIG. 7 is a partial perspective view of the cable anchor region of FIG. 3 with the mounting panel shown exploded upwardly from the rack.

As shown in FIGS. 4-6, the mounting panel 150 includes a body 151 having a first side 152 and a second side 153. The body 151 defines a first mounting section 154 and a second mounting section 155. A transition region 156 separates the first and second mounting sections 154, 155. The transition region 156 is curved or contoured so that the first and second mounting sections 154, 155 are parallel, but offset from each other. In the example shown, the first mounting section 154 is offset towards the first side 152 and the second mounting section 155 is offset towards the second side 153. A contoured section 159 is disposed at the bottom of the second mounting section 155. The contoured section 159 extends towards the first mounting section 154 so that a portion of the contoured section 159 is spaced a distance D (FIG. 6) from the second mounting section 155.

Arms 157 extend upwardly from opposite sides of the panel body 151. Mounting flanges 158 are provided at distal ends of the arms 157. The mounting flanges 158 are configured to secure to the bottom panel 131 of the anchor region 130 of the rack 100. In the example shown in FIG. 7, the bottom panel 131 includes one or more pems 134 that are sized to extend through one or more openings defined in the flanges 158. Washers 135 and nuts 136 secure over the pems to hold the flanges 158 to the bottom panel 131. In other implementations, separate fasteners can be utilized to secure the flanges 158 to the bottom panel 131. In still other implementations, the flanges 158 can snap-fit, latch, or otherwise secure to the bottom panel 131. In still other implementations, the flanges 158 can secure to the side panel 132.

Each of the mounting sections 154, 155 defines one or more mounting locations 160. Each mounting location 160 includes at least one fastener opening 165, 168. Each fastener opening 165, 168 is sized to receive a fastener 166, 169 (FIGS. 4, 5, 14 and 15). In the example shown in FIGS. 4 and 5, each mounting location 160 includes two fastener openings 165, 168. In certain implementations, a cutout 167 can be provided between the fastener openings 165 of one or more of the mounting locations 160 to identify which fastener openings 165 are associated with each other. For example, cutout 167a in FIG. 4 is disposed between two fastener openings 165a that form a first mounting location and cutout 167b is disposed between two fastener openings 165b that form a second mounting location adjacent the first mounting location. The cutouts 167 enable a user to identify associated fastener openings 165 when the user cannot see the panel 150 (e.g., when the panel 150 is located beneath the rack 100, above the user's head, or in an otherwise awkward position).

In some implementations, each mounting section 154, 155 defines at least one row of mounting locations 160. In certain implementations, the fastener openings 165, 168 are aligned along the respective row. In certain implementations, each mounting section 154, 155 defines at least two rows of mounting locations 160. In the example shown in FIGS. 4 and 5, each mounting section 154, 155 defines at least three rows of mounting locations 160. In certain implementations, the mounting locations 160 of one row are offset from the mounting locations 160 of the other rows.

In the example shown in FIGS. 4 and 5, the first mounting section 154 includes a first row 161 of mounting locations 160 at a top of the first mounting section 154 and a second row 162 of mounting locations 160 at a bottom of the first mounting section 154. The mounting locations 160 of the second row 162 are laterally offset from the mounting locations 160 of the first row 161. The mounting locations 160 have fastener openings 165 that are spaced a first distance apart. The first mounting section 154 also includes a third row 180 of mounting locations 160 that have fastener openings 168. The fastener openings 168 of each mounting location 160 in the third row 180 are spaced farther apart than the fastener openings 165 of the mounting locations in the first and second rows 161, 162. Accordingly, the mounting locations 160 in the third row 180 are configured to receive larger diameter cables than those received at the mounting locations of the first and second rows 161, 162.

The second mounting section 155 includes a first row 163 of mounting locations 160 at a top of the second mounting section 155 and a second row 164 of mounting locations 160 at a bottom of the second mounting section 155. The mounting locations 160 of the second row 164 are laterally offset from the mounting locations 160 of the first row 163. In certain implementations, the mounting locations 160 of the first row 163 of the second mounting section 155 are aligned with the mounting locations 160 of the first row 161 of the first mounting section 154. The second mounting section 155 also includes a third row 181 of mounting locations 160 that have fastener openings 168. The fastener openings 168 of each mounting location 160 in the third row 181 are spaced farther apart than the fastener openings 165 of the mounting locations in the first and second rows 163, 164. Accordingly, the mounting locations 160 in the third row 181 are configured to receive larger diameter cables than those received at the mounting locations of the first and second rows 163, 164.

In general, a cable 120 can be secured to the mounting panel 150 using a cable clamp arrangement. In accordance with some aspects of the disclosure, the cable clamp arrangement is configured to mount first to the cable 120 and second to the panel 150. Accordingly, the cable clamp arrangement can be assembled and secured to the cable 120 while a user has easy access to the cable and clamp components. The cable clamp arrangement is configured to facilitate installation of the cable clamp arrangement on the mounting panel 150. For example, the cable clamp arrangement can be configured to reduce the amount of steps in a mounting process for securing the cable clamp arrangement to the mounting panel 150. The cable clamp arrangement can be configured to reduce the number of loose components when positioning the cable clamp arrangement at the mounting panel 150, which may be located in an awkward place at a bottom or top of the rack 100.

Figure 8:
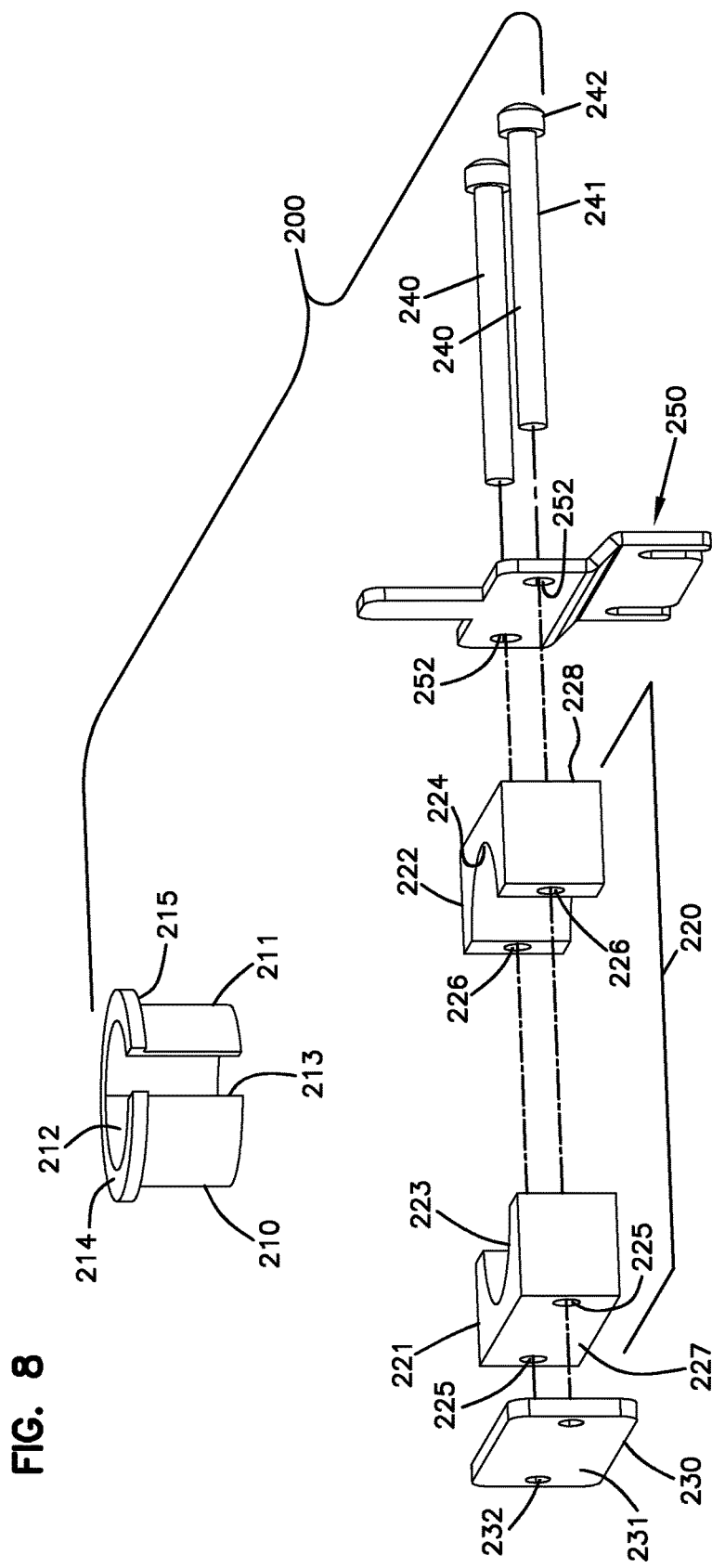
FIG. 8 is an exploded view of an example cable clamp arrangement.
Figure 9:
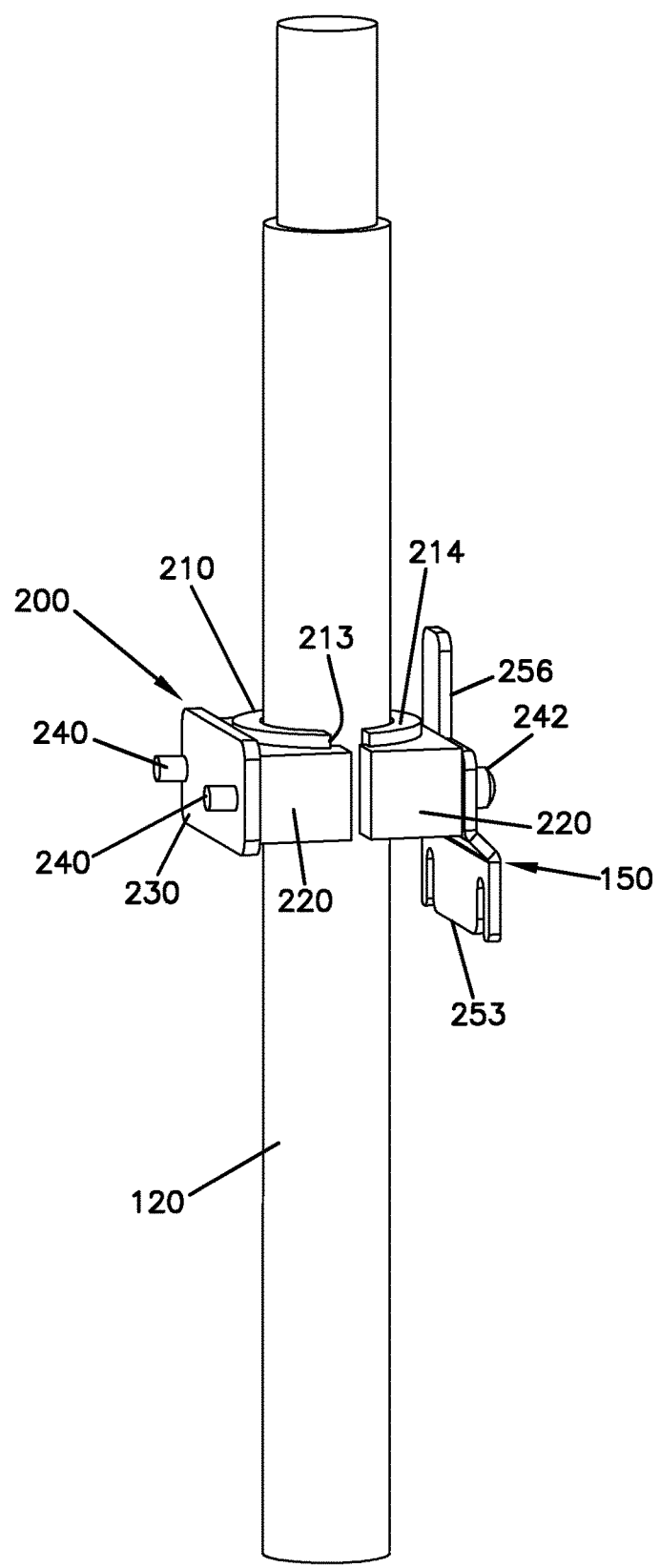
FIG. 9 is a perspective view of the cable clamp arrangement of FIG. 8 secured to a cable.
Figure 10:
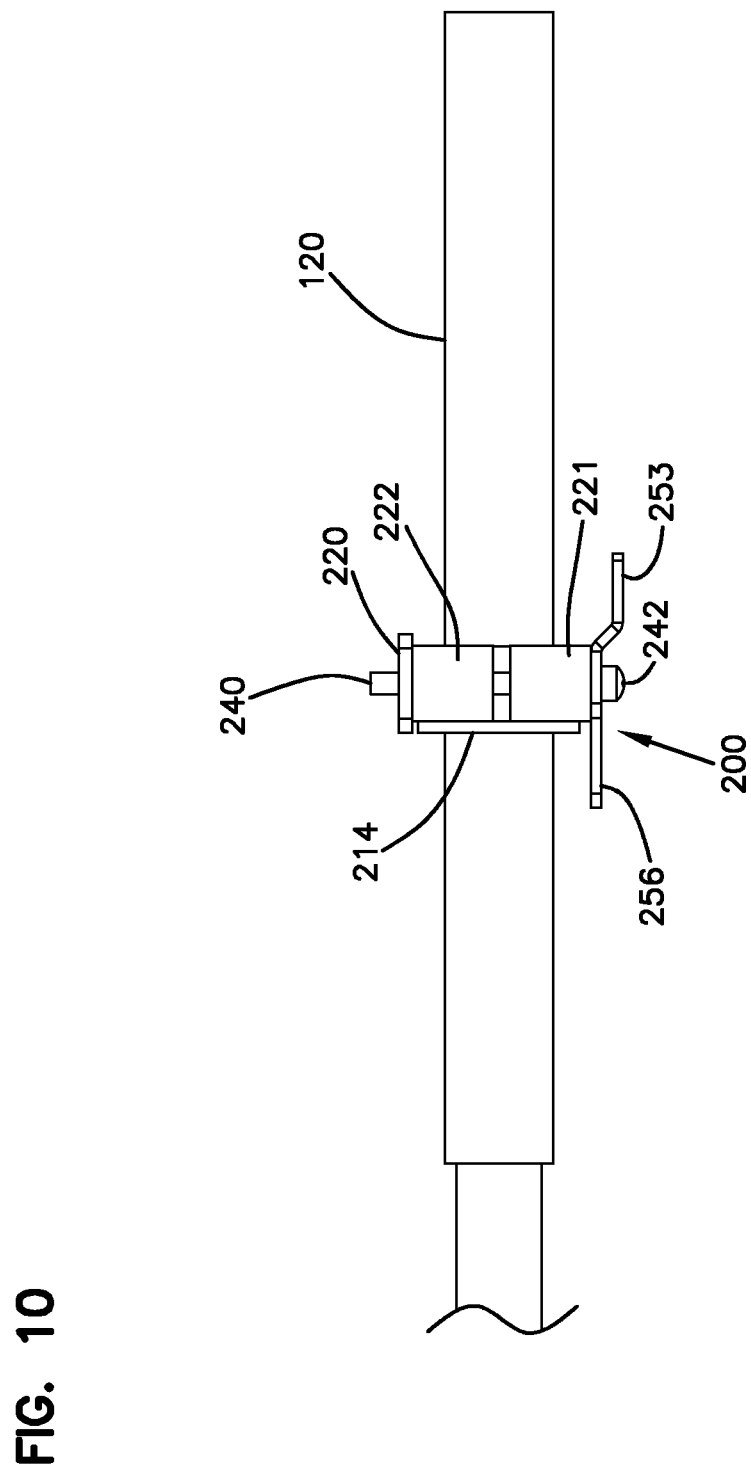
FIG. 10 is a side elevational view of the cable clamp arrangement and cable of FIG. 9.

FIGS. 8-10 illustrate one example cable clamp arrangement 200 suitable for use with a cable 120 and the mounting panel 150. The cable clamp arrangement 200 includes a grommet 210, a yoke 220, a back plate 230, fasteners 240, and a bracket 250 (see FIG. 8). The fasteners 240 extend through two or more of the components to enable radial compression of the grommet 210 around the cable 120 (see FIG. 9). The bracket 250 is configured to facilitate installation of the cable clamp arrangement 200 to the mounting panel 150 as will be disclosed in more detail herein.

As shown in FIGS. 9 and 10, the grommet 210 is configured to fit around an exterior surface of the cable 120. In some implementations, the grommet 210 includes a ring-shaped body 211 (FIG. 8) defining a passage 212 therethrough. The body 211 also defines a slit 213 leading from an exterior surface of the body 211 to the passage 212. The grommet body 211 is sufficiently flexible to enable the cable 120 to enter the passage 212 through the slit 213. The cable 120 extends generally in a first direction when extending through the passage 212. In certain implementations, the body 211 includes a ledge 214 extend radially outwardly from the body 211 to define an abutment surface 215.

The yoke 220 is configured to surround the grommet 210 (see FIG. 9). In certain implementations, the yoke 220 fully surrounds the grommet 210. In other implementations, the yoke parts 221, 222 are spaced apart when mounted around the grommet 210. In some implementations, the grommet 210 and the yoke 220 can be secured to each other to inhibit movement in at least one axial direction. In certain implementations, the grommet ledge 214 seats on the yoke 220 so that the abutment surface 215 engages a top of the yoke 220. In other implementations, the grommet 210 can define top and bottom ledges that sandwich the yoke 220 in between. In still other implementations, the grommet 210 is not axially secured to the yoke 220.

In some implementations, the yoke 220 includes a first part 221 and a second part 222 that is separate from the first part 221 (FIG. 8). Each of the parts 221, 222 defines a recessed section 223, 224, respectively, that is shaped to receive a portion of the grommet 210. Each of the yoke parts 221, 222 also defines through holes 225, 226 that align when the first and second parts 221, 222, respectively, are positioned around the grommet 210. In other implementations, the first and second parts 221, 222 of the yoke 220 can be pivotally or otherwise moveably connected to each other so that the yoke 220 can be wrapped or otherwise disposed around the grommet 210.

The back plate 230 is configured to engage a first exterior surface 227 of the yoke 220. The back plate 230 includes a plate body 231 defining one or more apertures 232. The apertures 232 of the back plate 230 align with the holes 225, 226 of the yoke 220. The bracket 250 is configured to engage a second exterior surface 228 of the yoke 220. The bracket 250 defines one or more apertures 252 that align with the apertures 232 of the back plate 230 and the holes 225, 226 of the yoke 220.

The cable clamp arrangement 200 is assembled by inserting the cable 120 into the grommet 210, assembling the yoke 220, back plate 230, and bracket 250 around the grommet 210, and inserting the fasteners 240 extend through the bracket 250, yoke 220, and back plate 230. The fasteners 240 include elongated bodies 241 extending between heads 242 and free ends. The heads 242 engage the bracket 250 and the free ends extend through the back plate 230. In certain implementations, the fasteners 240 thread to the back plate 230. In other implementations, nuts are threaded over ends of the fasteners 240 protruding through the back plate 230.

Figure 11:
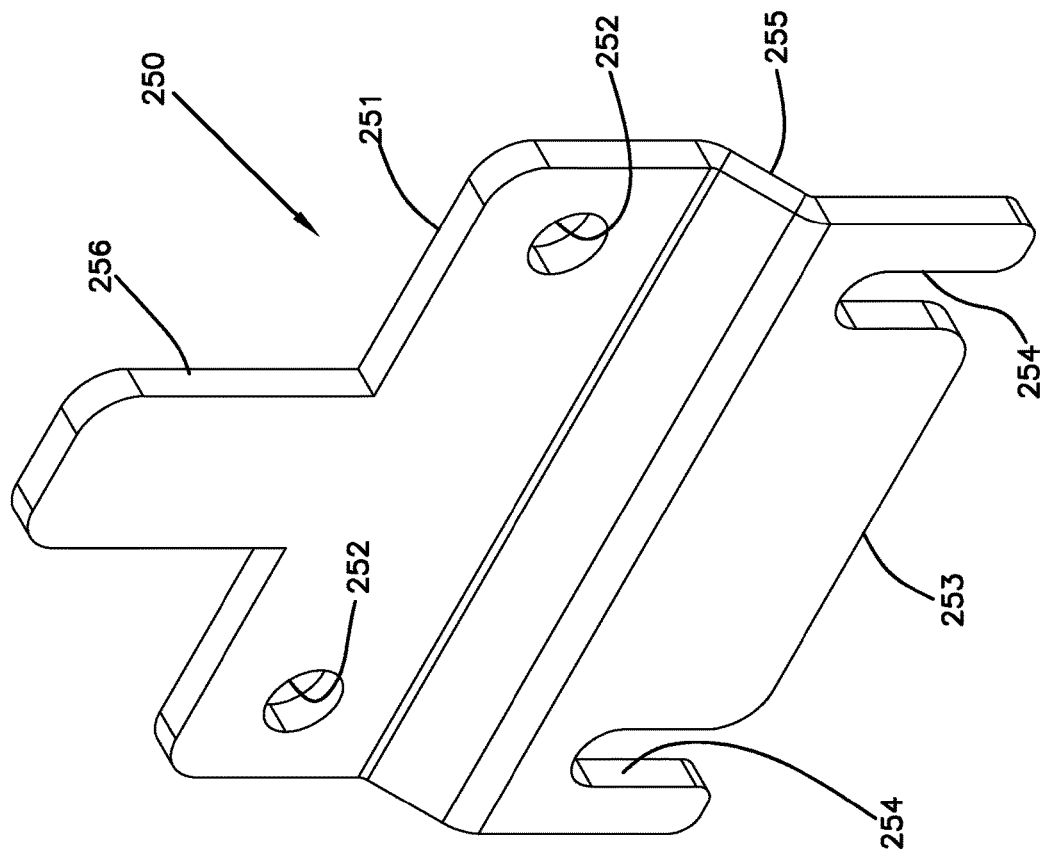
FIG. 11 is a perspective view of an example bracket suitable for use with the cable clamp arrangement of FIG. 8.
Figure 13:
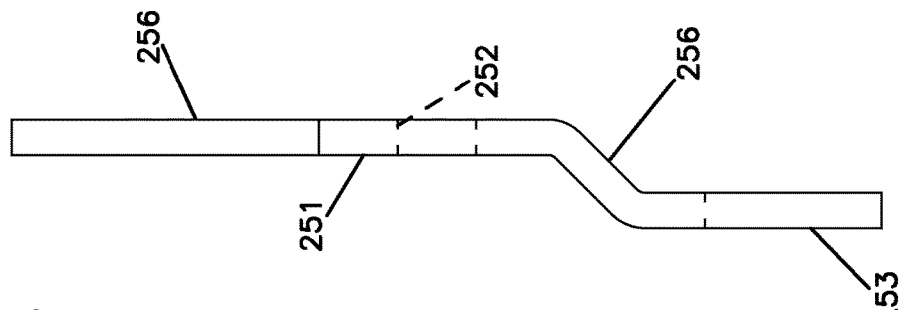
FIG. 13 is a side elevational view of the example bracket of FIG. 11.
Figure 12:
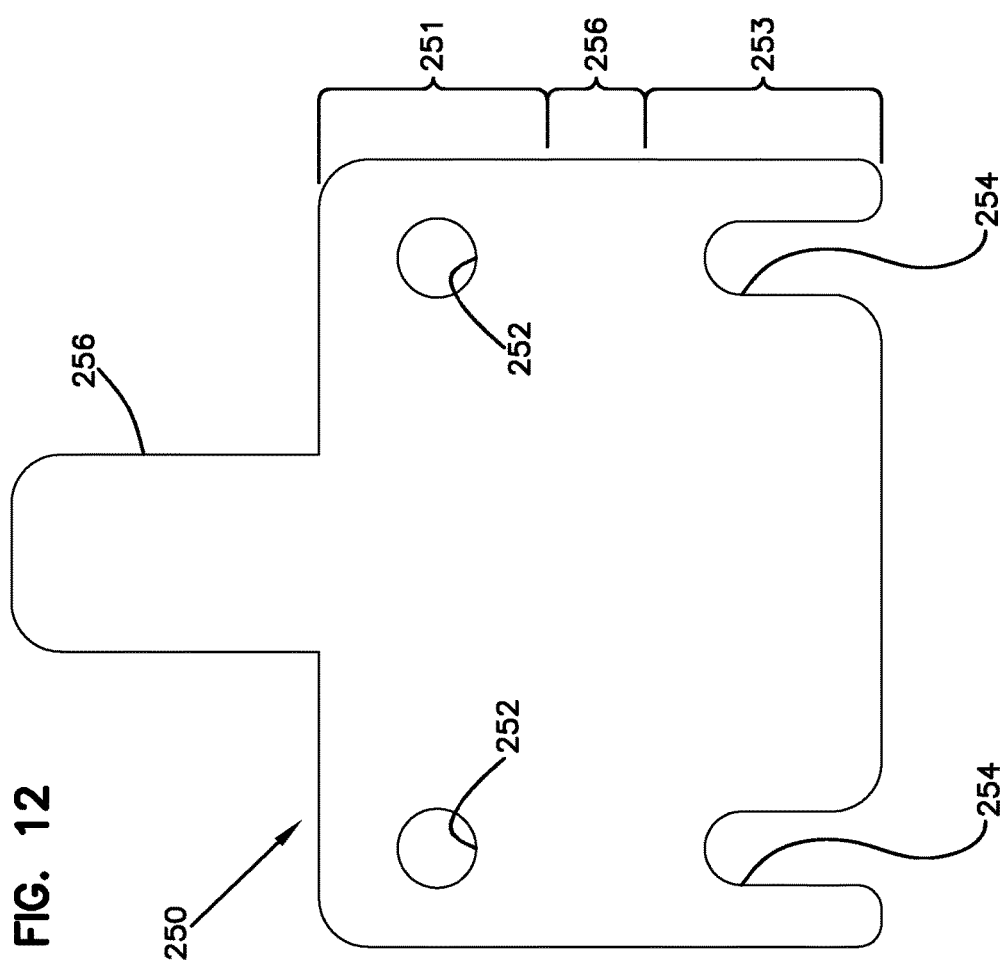
FIG. 12 is a front elevational view of the example bracket of FIG. 11.

FIGS. 11-13 illustrate one example bracket 250 suitable for use with the cable clamp arrangement 200. The example bracket 250 includes a first engagement region 251, a second engagement region 253, and a transition region 255. The first engagement region 251 defines the apertures 251 sized to receive the fasteners 240. In certain implementations, the transition region 255 is contoured so that the first engagement region 251 is parallel to and offset from the second engagement region 253. For example, the transition region 225 may be contoured to accommodate the heads 242 of the fasteners when the cable clamp arrangement 200 is mounted to the plate 150. In one example implementation, the bracket 250 includes a tab 256 to facilitate manufacturing and/or gripping of the bracket 250.

The second engagement region 253 defines one or more open-ended slots 254 that extend in the first direction. The open ends of the slots 254 face away from the apertures 252. The slots 254 of certain types of brackets 250 are spaced laterally apart to correspond to a spacing between fastener openings 165 of the mounting locations 160 in the first and second rows 161-164 of the mounting sections 154, 155. The slots 254 of other types of brackets 250 are spaced laterally apart to correspond to a spacing between the fastener openings 168 of the mounting locations 160 in the third rows 180, 181 of the mounting sections 154, 155. For example, the other types of brackets 250 may be formed larger (e.g., wider) than the certain types of brackets 250.

Figure 14:
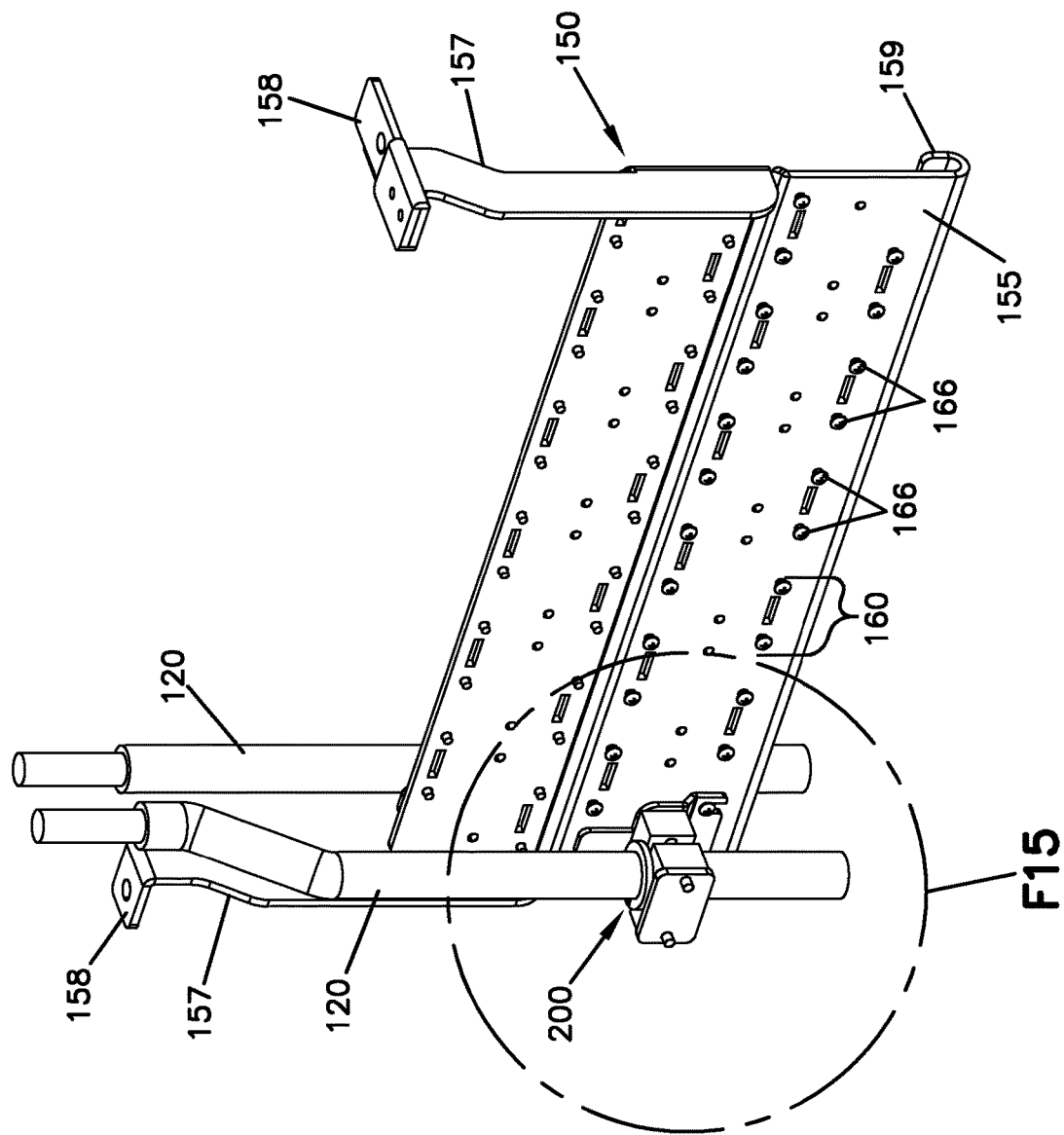
FIG. 14 is a perspective view of cables secured to an example mounting panel using cable clamp arrangements.
Figure 15:
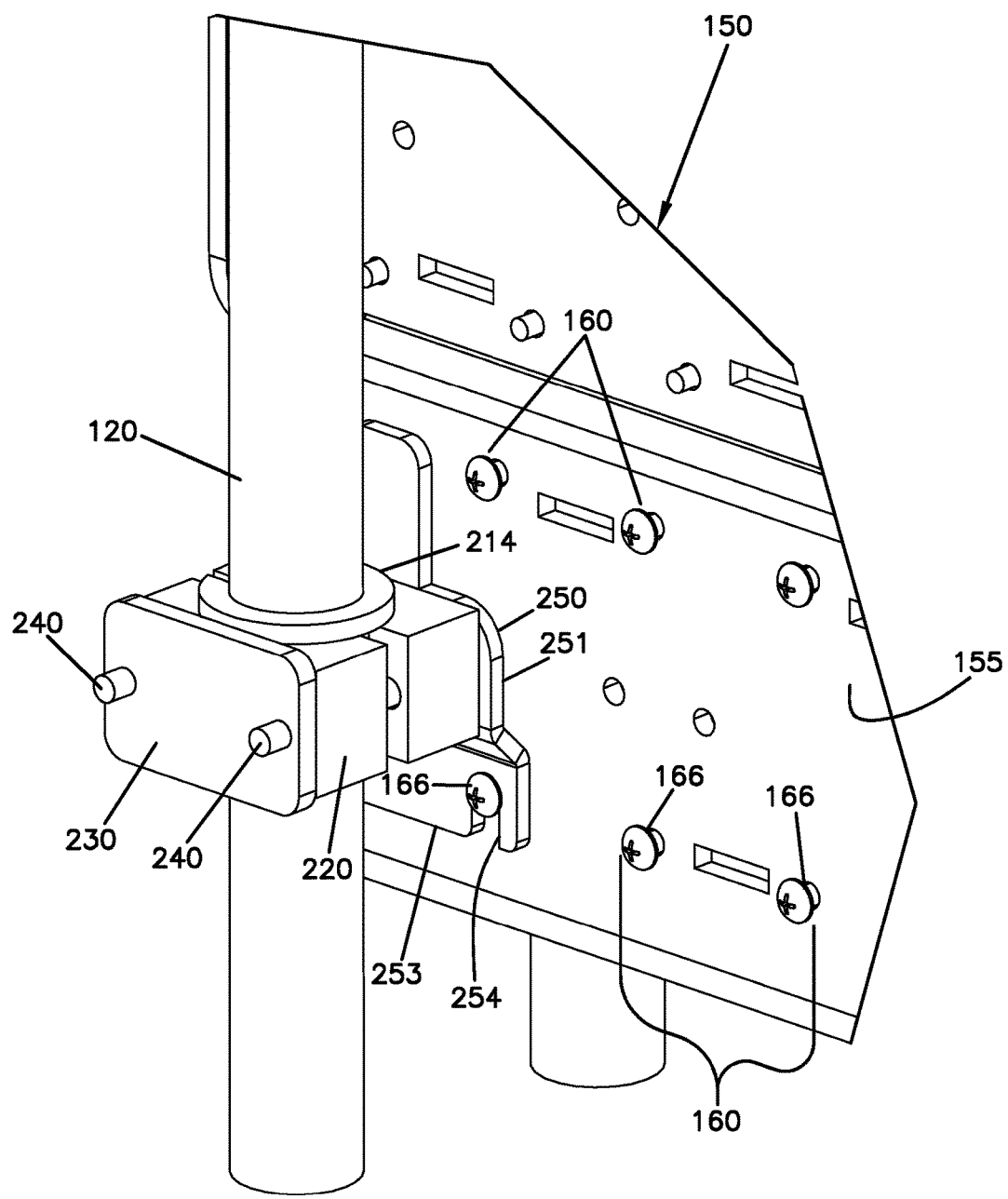
FIG. 15 is an enlarged view of a section of FIG. 14.

FIGS. 14 and 15 illustrate a cable clamp arrangement 200 assembled around a cable 120 and secured to the mounting panel 150 at one of the mounting locations 160. To mount the assembled cable clamp arrangement 200, the second engagement region 253 of the bracket 250 is positioned against the panel 150 above one of the mounting locations 160 so that the slots 254 align with the fasteners 166, 169 disposed at the mounting location 160. The bracket 250 is moved (e.g., slid) downwardly so that the fasteners 166, 169 disposed at the mounting location 160 enter the slots 254 through the open ends of the slots 254. A user tightens the fasteners 166, 169 to hold the bracket 250 to the panel 150.

In some implementations, the fasteners 166, 169 are tightened when the bracket 250 is slid sufficiently down to seat on the fasteners 166, 169. In certain implementations, the fasteners 166, 169 include screws that threadably engage the panel 150. In certain implementations, the fasteners 166, 169 are tightened using a tool, such as a screw driver. The cable 120 can be released from the panel 150 by loosening the fasteners 166, 169 and sliding the bracket 250 upwardly until the fasteners 166 clear the slots 254. In certain implementations, the fasteners 166, 169 can be removed from the panel to enable removal of the cable clamp arrangements 200 from the panel 150 without sliding. Accordingly, the cable clamp arrangements 200 can be removed from the middle or bottom rows 180, 162, 181, 164 even when the rest of the panel section 154, 155 is populated with cable clamp arrangements 200. In certain implementations, the fasteners 169 disposed in the third rows 180, 181 of mounting locations 160 are larger than the fasteners disposed in the first and second rows 161-164.

In some implementations, cables 120 can be clamped and anchored to both sides 152, 153 of the panel 150. For example, in certain implementations, the clamped cables 120 are mounted to the first side 152 of the panel 150 at the first mounting section 154 and are mounted to the second side 153 of the panel 153 at the second mounting section 155. Offsetting the mounting sections 154, 155 inhibits the fasteners 166 from interfering with the mounting of the cable clamp arrangements 200 to opposite sides of the panel 150.

In certain implementations, the transition region 156 offsets the first and second sections 154, 155 sufficient so that the fasteners 166 at the second mounting section 155 do not extend beyond the contoured section 159 at the bottom of the panel 150. Rather, the fasteners 166 are sufficiently short to extend no more than the distance D (FIG. 6) beyond the second mounting section 155. Accordingly, the contoured section 159 inhibits contact between the cables 120 mounted to the first mounting section 154 and the fasteners 166 disposed at the second mounting section 155.

Figure 16:
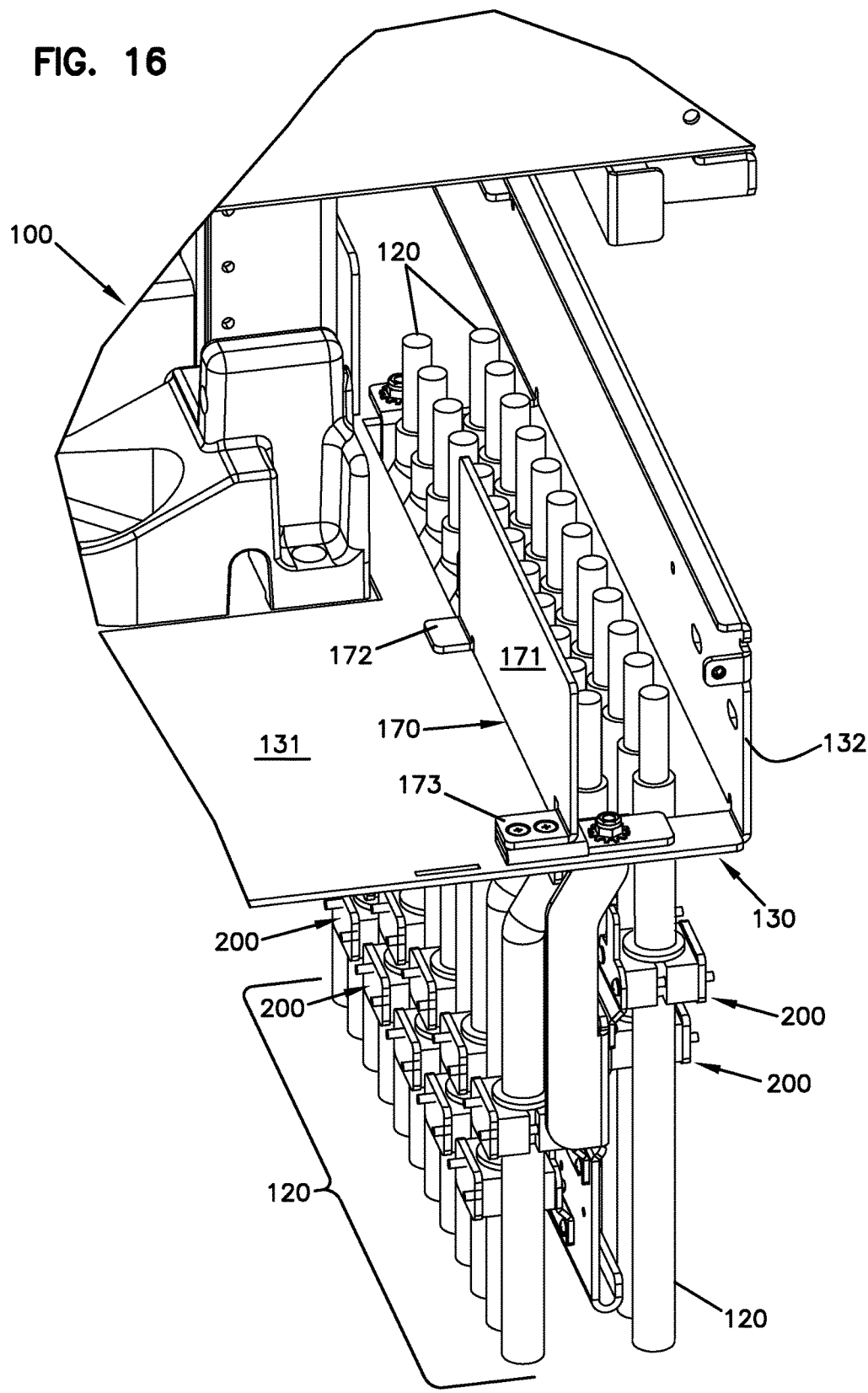
FIG. 16 is a partial perspective view of the cable anchor region of a rack at which cables are mounted to the rack using cable clamp arrangements and a mounting panel.

The panel 150 and cable clamp arrangements 200 mount the cables 120 to the rack 100 in one or more rows. In the example shown in FIG. 16, the panel 150 mounts the cables 120 to the rack 100 in four rows. Two of the rows are located at the first side 152 of the panel 150 and two of the rows are located at the second side 154 of the panel 150. The mounting locations 160 in the adjacent rows are staggered relative to each other.

In some implementations, a guide 170 can be installed to the rack 100 at the anchor region 130. For example, the guide 170 can be installed at the aperture 133 defined at the anchor region 130. In some implementations, the guide 170 includes a body 171 that extends upwardly from the bottom panel 131 to inhibit bending of the cables that otherwise might result in an interference with an installed splice chassis or other equipment at the rack. In certain implementations, the guide body 171 extends through the aperture 133. In certain implementations, the guide body 171 includes one or more tabs 172 that seat on the bottom panel 131 of the anchor region 130 to hold the guide 170 in position. In certain implementations, the guide body 171 includes a fastener tab 173. One or more fasteners (e.g., pems, screws, bolts, rivets, etc.) can extend through the fastener tab 173 and into the bottom panel 131 and/or into one of the tabs 158 of the mounting panel 150.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A cable anchor system configured to hold a section of a cable extending along a cable axis, the cable anchor system comprising:

a panel including a first mounting section at which a first mounting location is disposed, the first mounting location defining a fastener aperture;

a fastener disposed in the fastener aperture at the first mounting location;

a cable clamp arrangement including a bracket and a grommet, the bracket being sized to fit within a footprint of the panel, the bracket including a first engagement section, a transition region, and a second engagement section, the transition region being disposed between the first and second engagement sections to offset the first and second engagement sections from each other along the cable axis, the transition region being contoured so that the second engagement section also is parallel to and offset from the first engagement section in a first direction that is orthogonal to the cable axis, the first engagement section defining a slot that is sized and oriented to slide around the fastener at the first mounting location, the slot extending in a second direction from a closed end to an open end, the second direction being orthogonal to the first direction, the second engagement section being coupled to the grommet independent of the fastener; and a second cable clamp arrangement mounted to the panel at an opposite side of the panel from the first mounting section;

the fastener being configured to hold the bracket to the panel when the fastener is tightened at the first engagement section of the bracket and the first mounting section of the panel.

2. The cable anchor system of claim 1, wherein the first mounting section includes a plurality of additional mounting locations, each of the additional mounting locations defining an additional fastener aperture.

3. The cable anchor system of claim 2, wherein the mounting location and each additional mounting location also defines a second fastener aperture in which an additional fastener is received.

4. The cable anchor system of claim 2, further comprising a plurality of cable clamp arrangements mounted at the additional mounting locations at the first mounting section.

5. The cable anchor system of claim 4, wherein the plurality of cable clamp arrangements are disposed in a row.

6. The cable anchor system of claim 4, wherein the plurality of cable clamp arrangements are disposed in staggered rows.

7. The cable anchor system of claim 4, wherein each of the cable clamp arrangements includes a bracket sized to fit within the footprint of the panel, each bracket including a respective first engagement section defining an open-ended slot that is sized to slide around the fastener at the respective additional mounting location.

8. The cable anchor system of claim 1, wherein the panel includes a second mounting section defining a plurality of mounting locations, and wherein a transition region separates the first and second mounting sections, the transition region being contoured so that the first and second mounting sections are parallel, but offset from each other by more than a thickness of the panel.

9. The cable anchor system of claim 8, wherein the second mounting section is located at an opposite side of the panel from the first mounting location.

10. The cable anchor system of claim 8, wherein the second mounting section is parallel to the first mounting section.

11. The cable anchor system of claim 8, wherein the mounting locations of the second mounting section align with the mounting locations of the first mounting section.

12. The cable anchor system of claim 8, wherein the panel includes a flange that extends downwardly from the second mounting section, the flange defining a surface that is spaced a distance from the second mounting section towards the first mounting section, wherein any fasteners mounted to the second mounting section are sufficiently short to extend beyond the second mounting section no more than the distance the flange is spaced from the second mounting section.

13. The cable anchor system of claim 1, wherein the cable clamp arrangement also includes a yoke that is disposed between the grommet and the bracket and between the grommet and a back plate.

14. The cable anchor system of claim 13, wherein the grommet is configured to be transversely compressed between the bracket and the back plate.

15. The cable anchor system of claim 1, further comprising arms extending upwardly from opposite sides of the panel, wherein mounting flanges are provided at distal ends of the arms.

16. The cable anchor system of claim 1, wherein the second cable clamp arrangement includes a bracket sized to fit within a footprint of the panel.

17. The cable anchor system of claim 16, wherein the bracket of the second cable clamp arrangement includes an engagement section defining an open-ended slot.

18. The cable anchor system of claim 1, wherein the bracket includes a tab extending outwardly from the second engagement section opposite the first engagement section.

19. A cable anchor system to hold a section of cable extending along a cable axis, the cable anchor system comprising:
a panel including a first mounting section at which a first mounting location is disposed and a second mounting section at which a second mounting location is disposed, the second mounting section being offset from the first mounting section along the cable axis, the first mounting location defining a fastener aperture, the panel also including a transition region that is contoured so that the first mounting location is laterally offset from the second mounting location in a direction that is orthogonal to the cable axis;
a fastener disposed in the fastener aperture at the first mounting location; and
a cable clamp arrangement including a bracket and a grommet, the bracket being sized to fit within a footprint of the panel, the bracket including a first engagement section, and a second engagement section that is offset from the first engagement section, the first engagement section defining an open-ended slot that is sized to slide around the fastener at the first mounting location, the second engagement section being coupled to the grommet independent of the fastener.

20. The cable anchor system of claim 19, wherein the first mounting section includes a plurality of additional mounting locations, each of the additional mounting locations defining an additional fastener aperture.

21. The cable anchor system of claim 19, wherein the second mounting section is located at an opposite side of the panel from the first mounting location.

22. A cable anchor system configured to hold a section of a cable extending along a cable axis, the cable anchor system comprising:
a panel including a first mounting section at which a first mounting location is disposed, the first mounting location defining a fastener aperture, wherein the panel includes a second mounting section defining a plurality of mounting locations, and wherein a transition region separates the first and second mounting sections, the transition region being contoured so that the first and second mounting sections are parallel, but offset from each other by more than a thickness of the panel;
a fastener disposed in the fastener aperture at the first mounting location; and
a cable clamp arrangement including a bracket and a grommet, the bracket being sized to fit within a footprint of the panel, the bracket including a first engagement section, a transition region, and a second engagement section, the transition region being disposed between the first and second engagement sections to offset the first and second engagement sections from each other along the cable axis, the transition region being contoured so that the second engagement section also is parallel to and offset from the first engagement section in a first direction that is orthogonal to the cable axis, the first engagement section defining a slot that is sized and oriented to slide around the fastener at the first mounting location, the slot extending in a second direction from a closed end to an open end, the second direction being orthogonal to the first direction, the second engagement section being coupled to the grommet independent of the fastener;
the fastener being configured to hold the bracket to the panel when the fastener is tightened at the first engagement section of the bracket and the first mounting section of the panel.

23. A cable anchor system configured to hold a section of a cable extending along a cable axis, the cable anchor system comprising:
- a panel including a first mounting section at which a first mounting location is disposed, the first mounting location defining a fastener aperture;
- arms extending upwardly from opposite sides of the panel, wherein mounting flanges are provided at distal ends of the arms;
- a fastener disposed in the fastener aperture at the first mounting location; and
- a cable clamp arrangement including a bracket and a grommet, the bracket being sized to fit within a footprint of the panel, the bracket including a first engagement section, a transition region, and a second engagement section, the transition region being disposed between the first and second engagement sections to offset the first and second engagement sections from each other along the cable axis, the transition region being contoured so that the second engagement section also is parallel to and offset from the first engagement section in a first direction that is orthogonal to the cable axis, the first engagement section defining a slot that is sized and oriented to slide around the fastener at the first mounting location, the slot extending in a second direction from a closed end to an open end, the second direction being orthogonal to the first direction, the second engagement section being coupled to the grommet independent of the fastener;
- the fastener being configured to hold the bracket to the panel when the fastener is tightened at the first engagement section of the bracket and the first mounting section of the panel.

* * * * *